United States Patent [19]

Curti

[11] Patent Number: 4,715,193

[45] Date of Patent: Dec. 29, 1987

[54] PLANT FOR THE PRODUCTION OF POPSICLES AND ICECREAMS INCORPORATING A HOLDING STICK

[75] Inventor: Carlo Curti, Milan, Italy

[73] Assignee: Sauer S.p.A., Milan, Italy

[21] Appl. No.: 826,882

[22] Filed: Feb. 6, 1986

[30] Foreign Application Priority Data

Feb. 6, 1985 [IT] Italy .............................. 19405 A/85

[51] Int. Cl.$^4$ ............................................... A23G 9/26
[52] U.S. Cl. ................................. 62/345; 198/803.14; 425/126 R; 426/515
[58] Field of Search ................... 62/345, 63, 380, 356; 425/126 R, 126 S; 426/515; 198/803.14, 803.15, 851

[56] References Cited

U.S. PATENT DOCUMENTS

| | | | |
|---|---|---|---|
| 2,643,526 | 6/1953 | Turner | 62/345 X |
| 3,285,029 | 11/1966 | Pansing | 62/345 X |
| 3,857,252 | 12/1974 | Wight | 425/126 S X |
| 3,985,224 | 10/1976 | Harvey | 198/851 |
| 4,012,185 | 3/1977 | Poore et al. | 425/126 S X |
| 4,352,830 | 10/1982 | Billett et al. | 62/345 X |
| 4,548,573 | 10/1985 | Waldstrom | 62/345 X |
| 4,576,562 | 3/1986 | Anderson | 425/126 S |

*Primary Examiner*—William E. Tapolcai
*Attorney, Agent, or Firm*—Browdy and Neimark

[57] ABSTRACT

The invention relates to the technical field of commercial plants for the production of ice creams, and in particular to a plant for producing popsicles and ice creams incorporating a holding stick.

A plant (1) is provided, according to the invention, which has dies or molds (2) moving along a closed path with two superimposed main sections (4,5) which fit predominantly within a thermally insulated casing (10), and refrigerating members (18,22) including a plurality of cooler sets (18) fitting into said casing (10) and each having at least one fan (20a,20b) operative to circulate cool air along both main sections (4,5) of the path. The plant (1) also comprises a hot air thaw station (9) located at one end of said casing (10).

8 Claims, 11 Drawing Figures

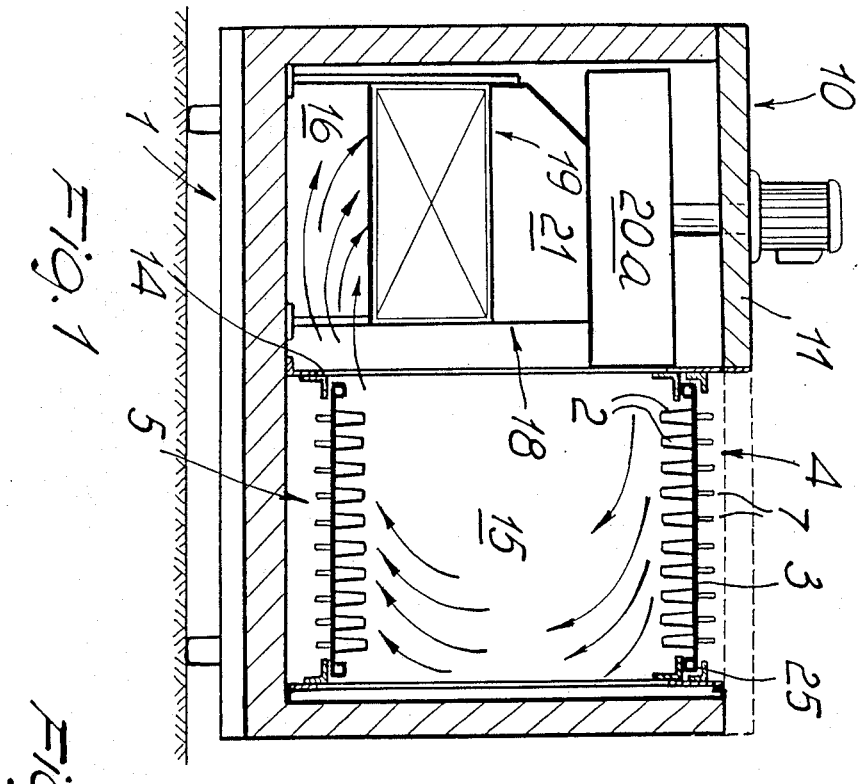
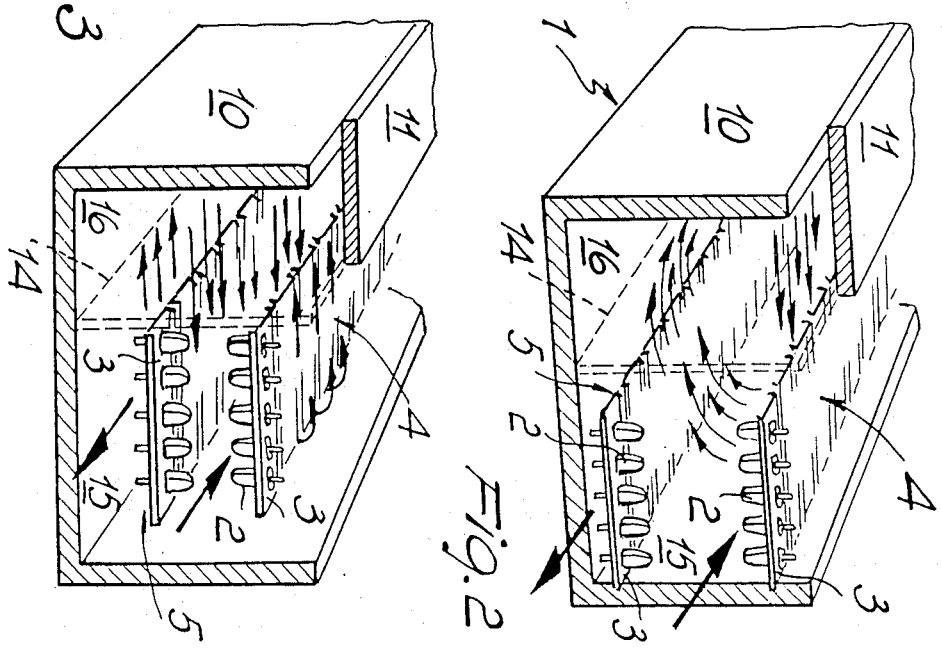

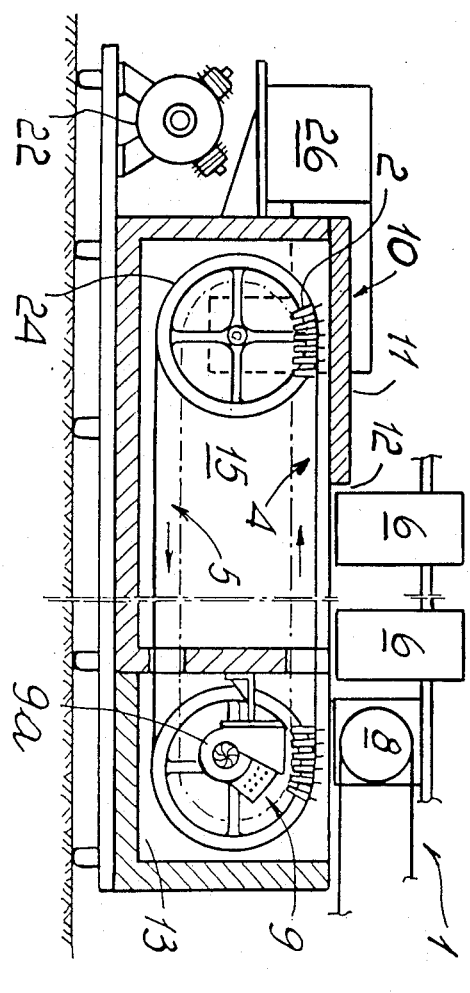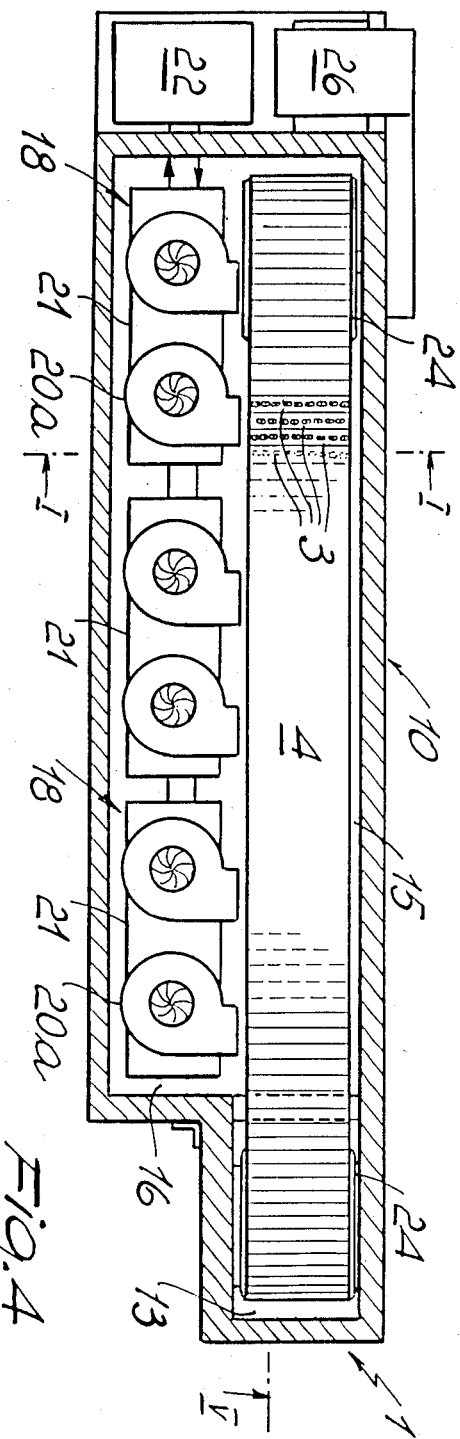

PLANT FOR THE PRODUCTION OF POPSICLES AND ICECREAMS INCORPORATING A HOLDING STICK

BACKGROUND OF THE INVENTION

This invention relates to a plant for the production of popsicles and icecreams incorporating a holding stick.

As is known, many icecreams and most popsicles are produced commercially on special plants of either circular or linear types wherethrough dies or patterns or molds holding the icecreams are made to advance. The molds are moved past a number of processing stations, such as dispensing stations whereat the liquids to be frozen are poured out, stick-applying stations, and shake-out stations for the molded icecreams or popsicles. In their movement past these stations, the molds are kept immersed in special refrigerating liquids contained in long vats which are raised to nearly level with the mold top openings.

Such plants have important deficiencies.

A first problem originates from the overall construction of the plants themselves, which are to convey the molds along closed paths for obvious practical and functional reasons. The closed paths may be circular and define a flat loop, or be substantially linear and define two main linear sections, a forward one and return one, superimposed on each other.

In the former case, the whole plant is potentially usable, and a processing station or a cooling section can be provided anywhere therethrough. However, the circular pattern is highly demanding on floor area, and makes the processing station layout difficult. In fact, if the stations are arranged on the inside of the loop structure, they are left with little available room, whereas if they are placed on the outside, access to the work area may become difficult. Furthermore, some dies or molds (the outermost ones) describe much longer paths than other dies or molds (the innermost ones). The outermost molds are, therefore, subjected to a more intense heat exchange with the refrigerating liquid. It should be noted, finally, that the molds must be arranged in groups on segmented rigid plates, and that for advancing such segmented plates special measures have to be taken, which increases costs.

The linearly extending plants, with two superimposed sections, are advantageous in that they fit more easily in the spaces available to production and in that the processing station layout is made easier. Accessibility to the work area is also quite satisfactory, and the dies or molds can be grouped over rigid plates of very simple, typically rectangular, design. With these plants, cooling is uniform for all the molds because these travel along equal paths.

On the other hand, linear plants have a bottom return run for the dies or molds which is left unused. Also the connecting portions, of semicircular shape, of the path for the molds are practically unusable.

The situation is further burdened by that along the bottom return run, the dies or molds are turned over and at ambient temperature. It follows that an amount of the icecream is lost, that is all the icecream which has not been removed at the end of the top run, and that the dies or molds become liable to contamination by the environment outside the plant. Contamination affects in particular the thawing residue of unextracted icecream. This situation actually dictates a mold flushing operation while they travel along the bottom run of their path.

A second problem of plants producing popsicles and icecreams incorporating a holding stick comes from the type of cooling universally adopted for such plants: cooling is provided by refrigerating liquids whereinto the molds to be cooled are substantially immersed.

The use of refrigerating liquids involves the provision of special channels therefor, special devices to circulate the liquids through said channels, and periodic cleaning operations which are complicated and expensive to carry out because they require that the cited channels be emptied.

Furthermore, the so-called "brine" is used normally as the refrigerating liquid, which comprises a calcium chloride solution. This brine has the specific disadvantage of contaminating and significantly corroding all the elements which are put in contact with it. Thus, all the equipment must be overhauled and replaced with some frequency, and the operators also feel the effects of the pollution brought about by the presence of said calcium chloride solution. There still exists, moreover, the potential hazard of contaminating the food products in the event of a malfunction of the devices that control the brine flow.

It is known to use refrigerating liquids other than said brine and such as to be potentially non-polluting and non-corrosive. However, the cost of such alternative liquids is high and not always acceptable.

It should be noted that prior plants employ liquids not only to refrigerate the dies or molds but also to heat the mold exteriors after they have been refrigerated, in order to favor withdrawal of the finished icecreams or popsicles. For example, hot water is used which is made to contact the molds on their leaving the cited brine by means of movable trays in the vertical direction on control by specially provided mechanisms. The latter further aggravate costs and the complexity of prior plants.

SUMMARY OF THE INVENTION

In the light of the above-outlined situation, the technical aim underlying this invention is to provide a plant for the production of popsicles and icecreams incorporating a holding stick, which can overcome substantially the cited prior drawbacks.

Within the above aim, it is an important object of this invention to provide a plant which, while affording functionality and reliability to a high degree, is simple construction-wise and of low cost, and has much reduced maintenance and setting requirements.

The above technical aim and this object are substantially attained by a plant for the production of popsicles and icecreams incorporating a holding stick, comprising a plurality of molds adapted to contain popsicles or icecreams being processed, a guide means for moving said molds along a closed path having two superimposed main sections, a forward one and a return one, and a thermally insulating casing, refrigerating members, and processing stations all laid out along said path for said molds, characterized in that predominant portions of both said main forward section and said main return section are accommodated within said thermally insulating casing, and in that said refrigerating members include a plurality of cooling sets accommodated in said casing and each having at least one fan for circulating cool air along both said main path sections.

BRIEF DESCRIPTION OF THE DRAWINGS

Further features and advantages of this invention will be more clearly understood from the following description of two preferred, but not exclusive, embodiments of a plant as indicated, with reference to the accompanying drawings, where:

FIG. 1 shows a cross-section through a plant according to a first embodiment of the invention;

FIGS. 2 and 3 bring out diagramaticaly some technical solutions adopted in the two embodiments of the inventive plant;

FIG. 4 is a plan view of the plant of FIG. 1 with the covers removed;

FIG. 5 is a fragmentary longitudinal section view of FIG. 4;

DESCRIPTION OF THE PREFERRED EMBODIMENT

Figure 6:
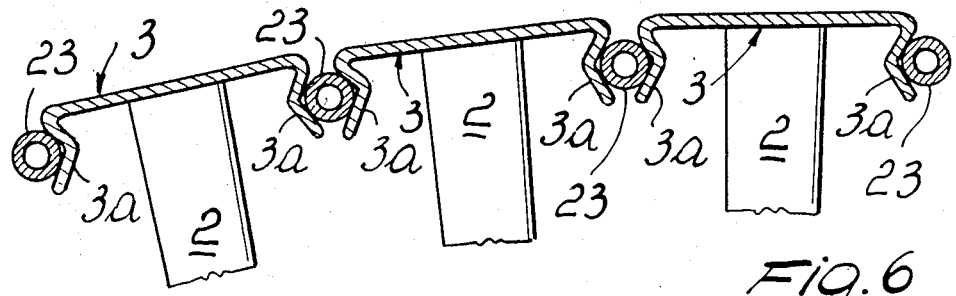
FIGS. 6 and 7 bring out in elevation and in perspective, respectively, how the rigid strips supporting the dies or molds are interconnected in airtight relationship.

With reference to the drawing figures, a plant according to this invention is comprehensively designated 1. The plant 1 is, in both of the embodiments shown, of the linear type having dies or molds 2 wherein core stick icecreams are formed. The molds 2 are arrayed by rigid strips 3 held side-by-side to form a substantially continuous belt. The strips 3 and their molds 2 are moved along a closed path having two main sections: a main forward section 4, or first section, located upwardly, and a main return section 5, or second section, located below the first section 4. At the ends of the two sections 4 and 5, there are a first jointing section 4a and second jointing section 5a of semicircular shape. Along the main forward section 4, there are arranged several processing stations, known per se, in part shown diagramatically in FIG. 5 and indicated at 6. For example, there may be provided a station for introducing a product to be frozen into the moulds 2, further completion and/or finishing stations for the icecreams being processed, and a station for driving sticks 7 into the not yet fully hardened icecream. All these working stations acts concurrently with cooling sets 18 forming part of refrigerating members to be explained hereinafter.

Also provided is a shake-out station 8 which may operate by catching the sticks 7. Shake-out of the frozen product is made possible by a thaw station 9 placed at the second jointing section 5a, below the shake-out station 8. The thaw station 9 is adapted to heat the outer surface of the molds 2, as will be explained hereinafter.

The path described by the molds 2 and strips 3, with the single exception of the second jointing section 5a where the shake-out 8 and thaw 9 stations are located, extends inside a casing 10 of large size capable of providing adequate thermal insulation. The casing 10 is provided with covers 11, and at the stations 6, with openings preferably grouped to form a single large opening 12. Furthermore, on the stations 8 and 9 side, passageways are provided for the molds 2 and strips 3 (FIG. 5) which are sized to fit closely around them.

The casing 10 is partitioned interiorly to form two chambers 15 and 16: a first chamber 15, or refrigerating chamber, accommodates the molds 2 and houses the processing stations 6, and a second chamber 16, or auxiliary chamber, which is closed at the top by said covers 11, houses cooling sets 18 which are connected to a refrigeration control unit 22. The chambers 15 and 16 are placed side-by-side and in mutual communication; only one structure 14 for partly supporting the cooling sets 18 is in fact provided therebetween, which is either configured as a board with large apertures or as a grid with framing elements.

The cooling sets 18 comprise, in either of the technical solutions depicted, evaporators 19, fans, and jointing channels 21 arranged between the fans and the evaporators 19.

The evaporators 19 are formed by a protective liner inside which are a large number of small channels wherethrough a refrigerating liquid, such as FREON 502 (a Du Pont de Nemours International S.A. trademark), is flown. Said small channels are interconnected by transverse fins which favor the thermal exchanges and direct the air circulated by said fans. The small channels extend between evaporators 19 and are terminated at a control unit 22 located externally of the casing 10 and comprising, in a manner known per se, a power compressor and all the necessary cooling checking and controlling elements.

Figure 11:
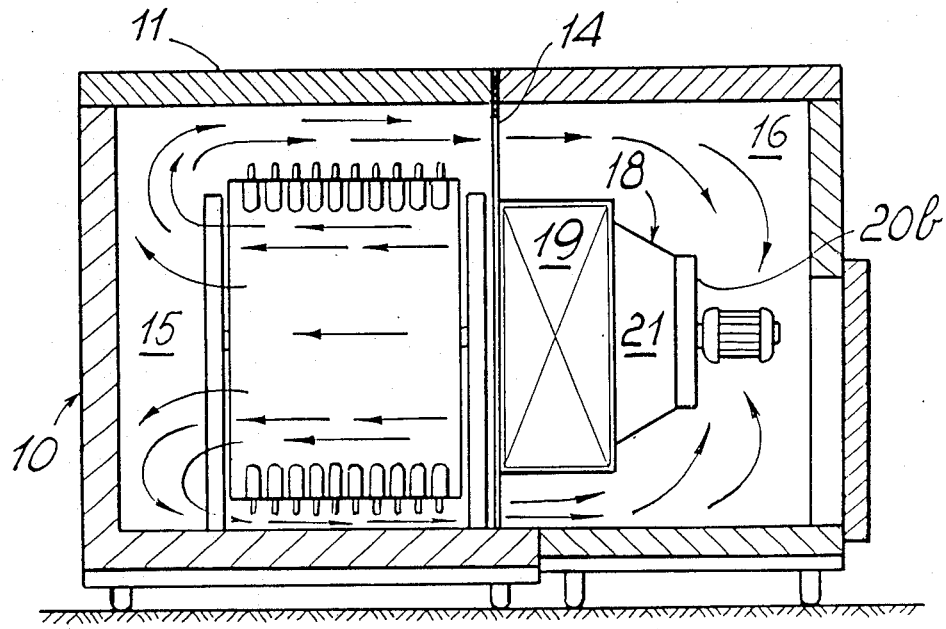
FIG. 11 shows diagramatically in cross-section a second embodiment of the plant of this invention.

The jointing or transport channels 21 have the function of forming a plenum or air cushion to better distribute the airflow over the entire surface of the evaporator 19. The jointing or transport channels 21 may be under pressure or vacuum. Said fans may be either of the centrifugal type, as indicated at 20a in FIGS. 1 and 4, or the axial flow type, as indicated at 20b in FIG. 11. In the instance of the centrifugal fans 20a, the cooling sets 18 would take substantially the form of towers in which there are stacked, the one on top of another, the evaporators 19, jointing channels 21, and centrifugal fans 20a. The latter are practically arranged at the top end of the second chamber or auxiliary chamber 16, at the same elevation as, or slightly below, the molds 2 on the main forward section 4. The jointing channels 21 are terminated at the suction inlets of the centrifugal fans 20a, which face downwards, and the combination of the jointing channel 21 and evaporators 19 define suction air intakes located at the bottom of the second or auxiliary chamber 16 level with the main return section 5, as shown in FIG. 1.

The axial flow fans 20b (FIG. 11) are also housed in the second or auxiliary chamber 16, and directed to create a perpendicular airflow to the direction of movement of the molds 2. It is envisaged that these fans be sized to provide higher intensity airflows at the main forward 4 and return 5 sections for the molds 2. The casing 10 is also made oversize relatively to the overall size of the main sections 4 and 5, thereby affording two return streams, respectively above the main forward section 4, at the top, and below the main return section 5, at the bottom.

The jointing or transport channels 21 are always interposed to the fans and the evaporators 19, and preferably, the latter are on the delivery side of the axial flow fans 20b, at a position (FIG. 11) closest to the first or cooling chamber 15. In this state, the evaporators 19 expand in the vertical direction by a distance almost equal to the distance of the main forward section 4 from the main return section 5.

It should be noted that whilst the second or auxiliary chamber 16 can be held closed at all times by the covers 11, the first or refrigerating chamber 15 has of necessity one or more top openings for operation of the processing stations 6. It is then envisaged that the strips 3 be interconnected in an airtight fashion.

Figure 7:
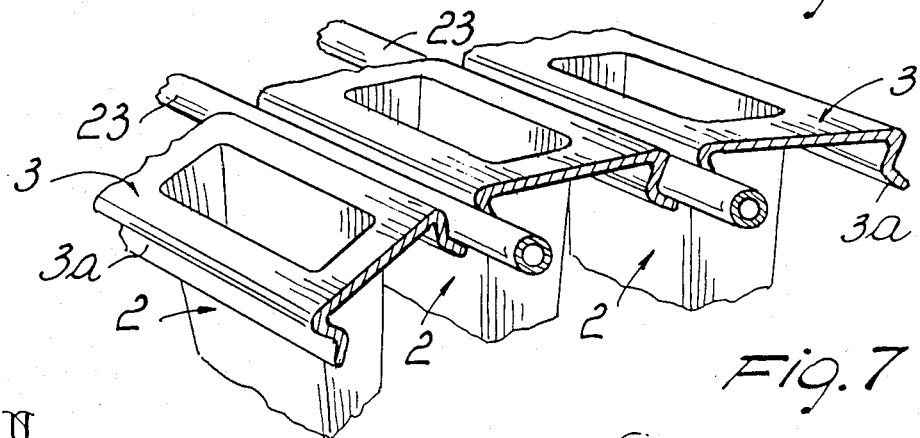

FIGS. 6 and 7 show, in fact, that the strips 3 have their major longitudinal edges 3a bent over and shaped to define, between adjoining strips, a cavity or seat. Through this cavity or seat there are inserted small flexible tubes 23 which can withstand low temperatures, e.g. made of rubber, or preferably, silicone. The flexible tubes 23 provide a seal between the strips and prevent air from leaking past the gaps between strips 3. Also, and foremost, the shape and position of the tubes 23 affords angular displacement of the strips 3 without losing their sealing action. The flexible tubes 23 also form, therefore, effective swivel elements between the strips 3.

The strips 3 fit, at the ends of the main sections 4 and 5, that is at the jointing sections 4a,5a, to large wheels 24 interconnected by chains 25. The wheels 24 and chains 25 form together a guide means for the strips 3.

In the examples depicted, there are provided the wheels 24 as the drive wheels located inside the casing 10, on the remote side from the thaw station 9. FIGS. 4 and 5 show diagramatically the drive members 26 for the drive wheels 24.

Figure 8:
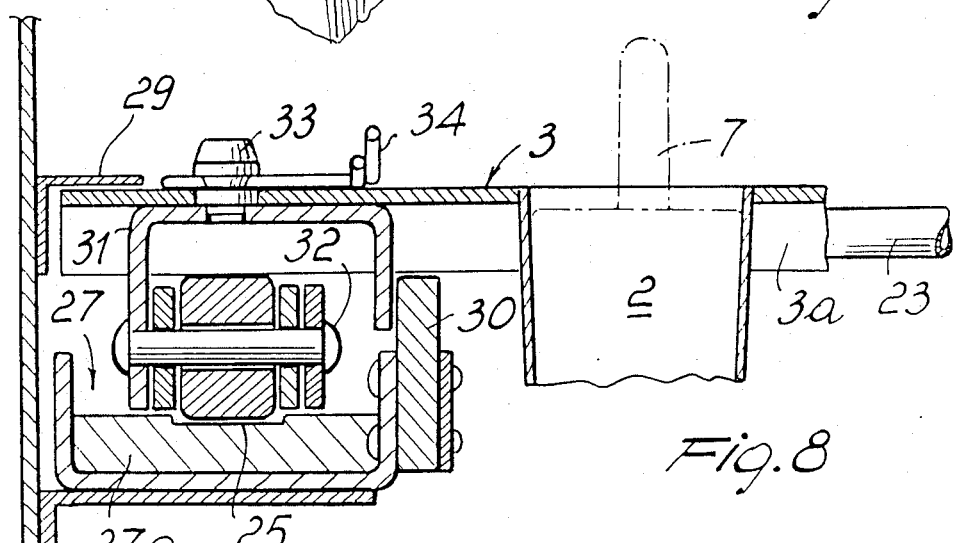
FIGS. 8 and 9 show two airtight seal devices provided at the ends of the mold supporting strips.
Figure 9:
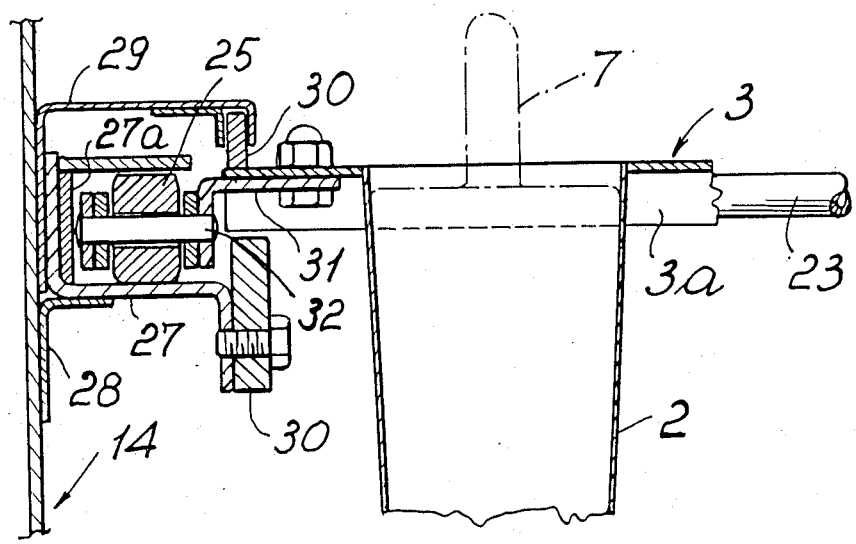

The drive chains 25 are shown in detail in FIGS. 8 and 9 and diagramatically only in FIG. 1. They engage with the ends of the strips 3, and at the same chains 25 there may be provided further airtight sealing members. In particular, the latter members are appropriate to the construction of FIG. 1.

The same FIGS. 8 and 9 show two substantially equivalent embodiments of said further sealing members: cradle elements 27 attached to brackets 28 and preferably provided with antifriction material 27a support the chains 25 and the ends of the strips 3. At the remote end, the strips 23 are enclosed by small sheets 29 and both the cradle elements 27 and the small sheets 29 may be provided with flexible lugs 30 arranged to barely tough the strips 3. The brackets 28 and sheets 29 are made rigid, in the embodiment of FIG. 1, on the one side with the cited structure 14, being located between the chambers 15 and 16 and engaged with the fans, and on the other side with a board adjacent to a wall of the casing 10 and quite similar to the structure 14.

Figure 10:
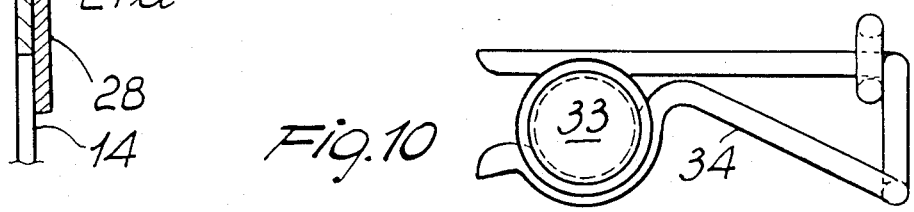
FIG. 10 is a detail view of FIG. 8.

FIGS. 8 and 9 also show that the strips 3 are secured to the chains 25 by means of supporting elements 31 which extend from the pins 32 of the chain 25. In the example of FIG. 8, the strips 3 are engaged with the supporting elements 31 through a quick connection contoured clip 34 (FIGS. 8 and 10) that snap fits into an annular groove formed in a pin 33 rigid with the supporting elements 31 and passed through the strips 3.

As shown in FIG. 5, the thaw station 9 acts on the molds 2 at the second jointing section 5a. In fact, the thaw station 9 is located within an end chamber 13 which is heat insulated and contiguous to the casing 10. At least one fan element 9a is provided which directs a stream of hot air toward the molds 2, while the latter are substantially below the shake-out station 8. The air is heated by flowing it through electric resistance heaters.

The plant operates as follows.

The several processing stations 6 which fill the molds 2 with products to be frozen, act at the main forward section 4 of the mold path, starting with the area directly adjacent to the shake-out station 8.

The molds as filled with products to be frozen travel along the main forward section 4 under the action of the refrigerating members at a speed whereby, at the end of the section 4, the filled product is sufficiently hard to permit of the molds to be turned over at the jointing section 4a.

The molds 2, in their upset condition, travel back through the casing 10, along the main return path 5. Also along this section 5, the molds 2 are subjected to the action of the refrigerating members, which direct over the molds air at a very low temperature, e.g. at about $-30°$ C. Air is cooled in flowing through the evaporators 19 and the cooling process is relatively rapid because the generated airflows follow short paths of which the sections within the evaporators are large portions, and because the high speed of the fans 20a,20b forces the air to pass through the evaporators 19 at a high rate.

Also the molds 2 and the icecreams contained therein are easily cooled down to desired levels. In fact, the airflow generated by each fan is concentrated on a reduced number of molds and the airflows follow a path so directed as to sweep above all over the molds 2 at both main sections, 4 and 5. In fact, with fans 20a of the centrifugal type, the generated air-flows are initially level with the main top section 4, as shown in FIGS. 1 and 2, and then forced to move along the main bottom section 5 as dictated by the suction effect at the bottom of the second chamber 16.

With fans of the axial flow type (FIGS. 3 and 11), the largest amount of airflow occurs again at the main top 4 and bottom 5 sections because the highest speed and broadest areas of the fans are the marginal areas, and because it is only close to the cited sections 4 and 5 that there are adequate spaces available for the return flow of the air driven by the fans.

It should be further noted that the presence of the molds 2 creates air eddies and turbulent phenomena which further increase the thermal exchange coefficient.

In summary, the air is cooled continuously by being passed repeatedly at the evaporators 19, and affords a very effective thermal exchange, owing to said turbulence and the narrow area affected, which is extended by that the molds 2 travel twice, forward and backward, inside the casing 10.

The air being circulated within the casing 10 is not dissipated to the environment despite the necessary presence of the opening 12; the strips 3 provide a seal, being connected together by the flexible tubes 23. In the instance of FIG. 1, a tight seal is provided, and so it is also at the end of the strips 3, and the main top section 4 forms in practice a real closure of the casing 10.

On completion of the cooling process, the molds 2 exit the casing 10 to enter the end chamber 13. The molds are surface heated herein, and the icecreams or popsicles are shaken out in a manner known per se by the shake-out station 8 which takes the icecreams to further processing or directly to packaging. The surface heating of the molds 2 is provided by a mere stream of hot air directed to sweep the molds from below.

Actual tests have demonstrated the effectiveness of the inventive plant. In particular, it should be noted that, despite the lower theoreticl effectiveness of the thermal exchanges by air circulation, instead of liquid circulation, freezing of the products within the molds 2 takes place in a most satisfactory manner. This results from the molds 2 being passed twice through the casing 10, the turbulent circulation of cool air at the molds 2, the repeated passing of air at the evaporators 19, located in an auxiliary chamber directly adjacent the refrigerating chamber, each fan concentrating its action on a limited number of molds, and from the seals provided, which minimize the outward flow of cool air without hindering the operation of the processing stations. The use of liquids has been eliminated not only for cooling purposes but also for the final heating during the shake-out step.

The plant has shown to have a simple construction, high reliability and low cost, as well as minimal checking and maintenance requirements.

I claim:

1. A plant for the production of popsicles and ice creams incorporating a holding stick, comprising
   a plurality of molds adapted to contain popsicles or ice creams being processed,
   a plurality of strips interconnected in an airtight fashion and supporting said molds,
   a guide means for moving said strips along a closed path having two superimposed main sections, a forward one and a return one,
   a thermally insulating open casing containing predominant portions of both said main forward section and said main return section, said main forward section substantially being an airtight upper closure of said casing,
   processing stations all laid out along said path for said strips, and
   refrigerating members including a plurality of cooling sets accommodated within said casing and having fans for circulating cool air along both said main path sections, said fans establishing a stream of air intersecting said main forward section from below, wherein
   said strips are rigid strips supporting arrays of said molds and having confronting edges having a bent over recessed shape,
   small flexible tubes are clamped between said edges, said small flexible tubes forming swivels between said strips and airtight seals, and
   further seals are provided at the ends of said strips and at chains for entraining the strips themselves, said further seals comprising cradle elements for supporting said chains, small sheets for covering said chains, and flexible lugs engaged with at least said cradle elements and carried slidably in contact with said strips.

2. A plant according to claim 1, in which said casing is substantially divided into two side-by-side intercommunicating chambers including a first refrigeration chamber containing predominant portions of both said main forward section and said main return section, and a second auxiliary chamber containing said cooling sets and their respective fans, in which said cooling sets have a substantially columnar structure presenting said fans at the top, at an elevation lower than the elevation of said main forward section, and inlets for the return air substantially level with said main return section.

3. A plant for the production of popsicles and ice creams incorporating a holding stick, comprising
   a plurality of molds adapted to contain popsicles or ice creams being processed,
   a guide means for moving said molds along a closed path having two superimposed main sections, including a forward one and a return one,
   a thermally insulating casing, refrigerating members, and plural processing station all laid out along said path for said molds,
   wherein
   predominant portions of both said main forward section and said main return section are accommodated within said thermally insulating casing,
   said refrigerating members include a plurality of cooling sets accommodated in said casing, each having at least one fan for circulating cool air along both said main path sections,
   rigid strips are provided to support arrays of said molds having confronting edges with a bent over recessed shape, and
   small flexible tubes are clamped between said edges, said small flexible tubes forming swivels between said strips and airtight seals, and
   said plant further comprising
   chains for entraining said rigid strips,
   further seal provided at the ends of said strips and at chains for entraining the strips, adapted to define a closure for said casing at openings formed in a top wall of the casing,
   cradle elements for supporting said chains,
   small sheets for covering said chains, and
   flexible lugs engaged with at least said cradle elements and carried slidably in contact with said strips.

4. A plant for the production of popsicles and ice creams incorporating a holding stick, comprising
   a plurality of molds adapted to contain popsicles or ice creams being processed,
   a plurality of strips supporting said molds, said strips being rigid strips supporting arrays of said molds and provided with confronting edges having a bent over recessed shape,
   a guide means, engaging ends of said rigid strips transversal to said confronting edges, for moving said strips along a closed path having two superimposed main sections, a forward one and a return one, said main forward section being located above said main return section,
   processing stations all laid out along said path for said strips,
   refrigerating members including a plurality of cooling sets having fans for circulating cool air along both said main path sections, said fans establishing a stream of air intersecting said main forward section from below,
   a thermally insulating open casing having a top wall forming openings, and containing predominant portions of both said main forward section and said main return section,
   small flexible tubes clamped said confronting edges and forming swivels between said strips and airtight seals, and
   further seals provided at said ends of said strips,
   said main forward section, said small flexible tubes and said further seals forming an airtight upper closure of said openings in said top wall of said thermally insulating open casing.

5. A plant according to claim 4, in which said guide means includes chains for entraining said rigid strips and in which said further seals comprise cradle elements for supporting said chains, small sheets for covering said chains, and flexible lugs engaged with at least said cradle elements and carried slidably in contact with said strips.

6. A plant according to claim 4, in which said thermally insulating open casing is substantially divided into two side-by-side intercommunicating chambers including a first refrigeration chamber containing predominant portions of both said main forward and return sections and a second auxiliary chamber containing said cooling sets, said top wall forming a continuous cover on said second auxiliary chamber and having said openings on said first refrigeration chamber.

7. A plant for the production of popsicles and ice creams incorporating a holding stick, comprising
   a plurality of molds adapted to contain popsicles or ice creams being processed,
   a plurality of strips supporting said molds, said strips being rigid strips supporting arrays of said molds and provided with confronting edges having a bent over recess shape,
   a guide means, including chains engaging ends of said rigid strips transversal to said confronting edges, for moving said strips along a closed path having two superimposed main sections, a forward one and a return one, said main forward section being located above said main return section,
   processing stations all laid out along said path for said strips,
   refrigerating members including a plurality of cooling sets having fans for circulating cool air along both said main path sections, said fans establishing a stream of air intersecting said main forward section from below,
   a thermally insulating open casing having a top wall forming openings, and containing predominant portions of both said main forward section and said main return section,
   small flexible tubes clamped between said confronting edges and forming swivels between said strips and airtight seals, and
   further seals comprising cradle elements for supporting said chains, small sheets for covering said chains, and flexible lugs engaged with at least said cradle elements and carried slidably in contact with said strips,
   said main forward section, said small flexible tubes and said further seals forming an airtight upper closure of said openings in said top wall of said thermally insulating open casing.

8. A plant for the production of popsicles and ice creams incorporating a holding stick, comprising
   a plurality of molds adapted to contain popsicles or ice creams being processed,
   a plurality of strips supporting said molds, said strips being rigid strips supporting arrays of said molds and provided with confronting edges having a bent over recessed shape,
   a guide means, including chains engaging ends of said rigid strips transversal to said confronting edges, for moving said strips along a closed path having two superimposed main sections, a forward one and a return one, said main forward section being located above said main return section,
   processing stations all laid out along said path for said strips,
   refrigerating members including a plurality of cooling sets having fans for circulating cool air along both said main path section, said fans establishing a stream of air intersecting said main forward section from below,
   a thermally insulating open casing having a top wall forming openings, and containing predominant portions of both said main forward section and said main return section,
   said thermally insulating open casing being substantially divided into two side-by-side intercommunicating chambers including a first refrigeration chamber containing predominant portions of both said main forward and return sections and a second auxiliary chamber containing said cooling sets, said top wall forming a continuous cover on said second auxiliary chamber and having said openings on said first refrigeration chamber,
   small flexible tubes clamped between said confronting edges and forming swivels between said strips and airtight seals, and
   further seals comprising cradle elements for supporting said chains, small sheets for covering said chains, and flexible lugs engaged with at least said cradle elements and carried slidably in contact with said strips,
   said main forward section, said small flexible tubes and said further seals forming an airtight upper closure of said openings in said top wall of said thermally insulating open casing.

* * * * *